May 20, 1924.
G. W. INGERSOLL
SPRING SPREADER
Filed April 4, 1923
1,494,914
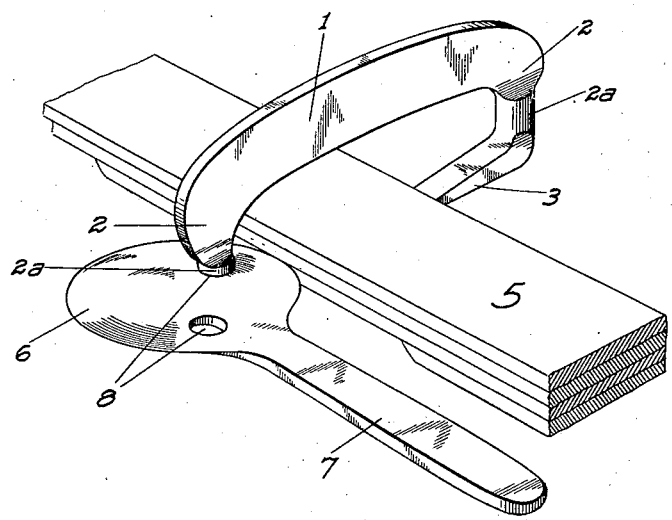
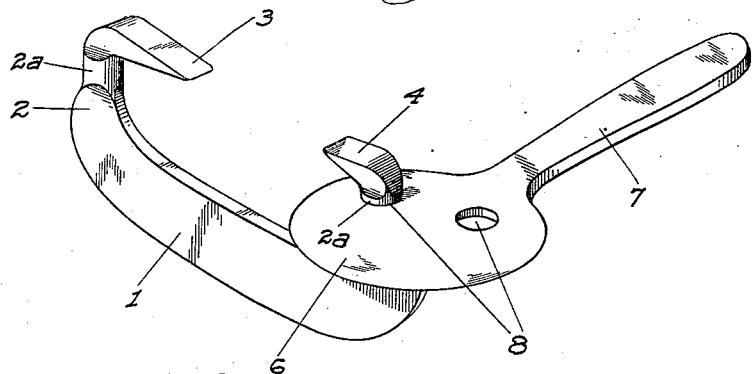
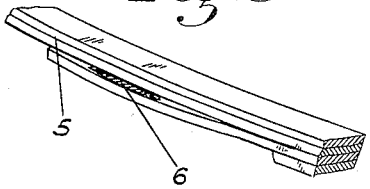
INVENTOR.
George W. Ingersoll
BY
ATTORNEY Patented May 20, 1924.

1,494,914

UNITED STATES PATENT OFFICE.

GEORGE W. INGERSOLL, OF STOCKTON, CALIFORNIA, ASSIGNOR OF ONE-HALF TO CLAUD CORPENING, OF STOCKTON, CALIFORNIA.

SPRING SPREADER.

Application filed April 4, 1923. Serial No. 629,840.

*To all whom it may concern:*

Be it known that I, GEORGE W. INGERSOLL, a citizen of the United States, residing at Stockton, county of San Joaquin, State of California, have invented certain new and useful Improvements in Spring Spreaders; and I do declare the following to be a full, clear, and exact description of the same, reference being had to the accompanying drawings, and to the characters of reference marked thereon, which form a part of this application.

This invention relates to improvements in spreading apart the leaves of vehicle springs, an operation done when it is desired to efficiently lubricate the adjacent faces of the leaves.

The principal object of my invention is to provide a device for the purpose by means of which springs of any reasonable variation in width may be spread in a very quick and efficient manner, and with only the employment of a very small amount of physical effort in so doing.

I have also arranged for enabling the leverage obtained being altered very quickly and easily, so that the operator may instantly accommodate the tool to suit the strength of spring being spread.

Further, the device is extremely simple in construction, there being no parts to get out of order or needing constant lubrication or other attention.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a perspective view of the device showing the same applied to a spring.

Fig. 2 is a view of the tool itself, detached.

Fig. 3 is a fragmentary view showing the cam-disc inserted between a pair of spring leaves.

Referring now more particularly to the characters on the drawings, the stationary member of the spreader comprises a rigid back 1 bent at its opposite ends to form arms 2 whose outer ends are bent toward each other and parallel to the back 1 to form wedges 3 and 4 of uneven length, the arms 2 adjacent said wedges being circular in cross section as shown at $2^a$ and are parallel to each other and lie in a common plane.

The outer edges of the wedges lie parallel to each other and are in planes at right angles to the axes of the round arm portions $2^a$.

The distance between the wedges is greater than the width of any spring to be operated on, and either at a time is adapted to be engaged with the crevice between any two leaves 5 of the spring, the back 1 extending across the spring, either above or below, depending on whether the operator is working up from the bottom of the spring or down from the top.

To engage a crevice between leaves on the opposite side of the spring I provide a cam-disc 6, wedge shaped in cross section from axis to periphery, and having an operating handle 7 extending substantially radially therefrom. Drilled through said disc at points differently offset from the axis thereof, and on the side of said axis nearest the handle, are holes 8, adapted to fit easily over either of the circular arm portions $2^a$, the latter thus serving as spindles and the axes of turning of the cam disc. Said disc is placed in position on either of said portions by first slipping the corresponding wedge through that one of the holes 8 to be used, the width of said wedges being less than the diameter of the holes.

In operation it will be seen that after the stationary member is placed as above stated, and manipulated so that the edge of the disc is alined with a leaf-crevice on the opposite side, a turning of the handle in the proper direction will cause the edge of the disc to enter said crevice and the disc being wedge-shaped, but very little pressure on the handle will be necessary to cause the disc to force its way a suitable distance between the spring leaves, causing the latter to be spread apart. At the same time, due to the pressure exerted, which is imparted to the stationary member in the opposite direction, the wedge 3 engaged with the opposite spring-crevice will likewise be forced between the leaves and will spread them apart.

It will be evident that a single reciprocating movement of the handle causes the spring leaves to be spread and released, so that the operation of springing all the necessary leaves of a spring will consume but a very short time.

If springs of small or ordinary width are being operated on, the disc is mounted under the short wedge 4, whereas if wide springs are to be spread, the disc is mounted under the opposite wedge 3, the length of the latter being of course somewhat less than the distance from the axis of the cam to the farthest edge thereof.

Changing the mounting of the disc from one hole 8 to the other, alters the location of the axis of turning from the outer end of the handle, and also from the opposite periphery of the disc, and consequently alters the leverage of the device.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure of the spirit of the invention, as defined by the appended claims.

Having thus described my invention, what I claim as new and useful and desire to secure by Letters Patent is:

1. A spring spreader comprising a rigid member having arms at its ends bent at right angles thereto, wedges on the outer edges of the arms facing each other, a wedge cam-disc, and means whereby said disc may be turnably mounted on an arm under the wedge thereon, the latter then serving to prevent undesired removal of said disc.

2. A spring spreader comprising a rigid member having arms at its ends bent at right angles thereto, wedges on the outer edges of the arms facing each other, a wedge cam-disc, at least one of said arms under its wedge being formed as a circular spindle to fit a hole provided in the disc, said disc being removably mounted on the spindle.

3. A spring spreader comprising a rigid member having arms at its ends bent at right angles thereto, wedges on the outer edges of the arms facing each other, a wedge cam-disc, at least one of said arms being formed as a circular spindle to pass through a hole provided in the disc, the spindle being of greater cross sectional area than the wedge therebeyond whereby the orifice in the disc may pass freely over the wedge to be engaged by the spindle.

4. A spring spreader comprising a rigid back member, a pair of spindles at the ends of the back member at right angles thereto and parallel to each other, wedges of uneven lengths facing each other and fixed at the outer ends of the spindles, and a cam disc adapted to be turnably mounted on either one of said spindles.

In testimony whereof I affix my signature.
GEORGE W. INGERSOLL.